United States Patent
Siakos et al.

(10) Patent No.: US 11,231,157 B2
(45) Date of Patent: Jan. 25, 2022

(54) LIGHTING DEVICE FOR A VEHICLE, IN PARTICULAR AN ELECTRIC VEHICLE

(71) Applicant: Byton Limited, Hong Kong (HK)

(72) Inventors: Nikolaos Siakos, Munich (DE);
Clement Hoffner, Munich (DE);
Benoit Jacob, Munich (DE)

(73) Assignees: BYTON LIMITED, Hong Kong (CN);
BYTON GMBH, Ismaning (DE)

( * ) Notice: Subject to any disclaimer, the term of this patent is extended or adjusted under 35 U.S.C. 154(b) by 0 days.

(21) Appl. No.: 16/645,451

(22) PCT Filed: Aug. 10, 2018

(86) PCT No.: PCT/EP2018/071834
§ 371 (c)(1),
(2) Date: Mar. 6, 2020

(87) PCT Pub. No.: WO2019/048183
PCT Pub. Date: Mar. 14, 2019

(65) Prior Publication Data
US 2020/0278100 A1  Sep. 3, 2020

(30) Foreign Application Priority Data
Sep. 6, 2017  (DE) .......................... 102017120532.2

(51) Int. Cl.
*F21S 43/20* (2018.01)
*F21S 43/145* (2018.01)
(Continued)

(52) U.S. Cl.
CPC ............ *F21S 43/26* (2018.01); *B60Q 1/2615* (2013.01); *F21S 43/145* (2018.01); *F21S 43/30* (2018.01);
(Continued)

(58) Field of Classification Search
CPC .......... F21S 43/26; F21S 43/145; F21S 43/30; B60Q 1/2615; F21W 2013/55; F21W 2105/00
See application file for complete search history.

(56) References Cited

U.S. PATENT DOCUMENTS 4,733,335 A    3/1988  Serizawa et al.
9,656,598 B1*  5/2017  Salter ................... B60Q 1/2619
(Continued)

FOREIGN PATENT DOCUMENTS

DE    3315785 A1    11/1984
DE    3916875 A1    12/1990
(Continued)

OTHER PUBLICATIONS

The International Search Report and Written Opinion of PCT Application No. PCT/EP2018/071834, dated Nov. 28, 2018, 14 pages.

*Primary Examiner* — Anh Q Tran
(74) *Attorney, Agent, or Firm* — Womble Bond Dickinson (US) LLP

(57) ABSTRACT

The disclosure relates to a lighting device, in particular for integration into a vehicle surface, having a cover with optically opaque surface areas, a light-source carrier, arranged behind the cover and having a plurality of light sources, and signal structures which are arranged between the surface areas and can be illuminated for light emission, wherein different signal patterns can be adjusted by selective control of certain of the light sources for trans-illumination or illumination of one or more associated signal structures. The disclosure further relates to a vehicle, having such a lighting device, and to a method for carrying out various signal functions with such a lighting device.

13 Claims, 9 Drawing Sheets

(51) Int. Cl.
  *F21S 43/30* (2018.01)
  *B60Q 1/26* (2006.01)
  *F21W 105/00* (2018.01)
  *F21W 103/55* (2018.01)

(52) U.S. Cl.
  CPC ..... *F21W 2103/55* (2018.01); *F21W 2105/00* (2018.01)

(56) References Cited

U.S. PATENT DOCUMENTS

| | | |
|---|---|---|
| 2006/0176710 A1 | 8/2006 | Meinke et al. |
| 2015/0023039 A1* | 1/2015 | Seo ................. F21S 41/336 362/516 |
| 2015/0210226 A1 | 7/2015 | Topart et al. |
| 2015/0217681 A1* | 8/2015 | Dellock ................. B60Q 1/26 362/510 |
| 2016/0146420 A1 | 5/2016 | Gyu et al. |
| 2017/0332463 A1* | 11/2017 | Buttolo ................. B60Q 3/80 |
| 2017/0355321 A1* | 12/2017 | Dellock ................. F21S 43/16 |

FOREIGN PATENT DOCUMENTS

| | | |
|---|---|---|
| DE | 4228895 A1 | 3/1994 |
| DE | 10021114 A1 | 11/2001 |
| DE | 20216984 U1 | 2/2003 |
| DE | 102013008192 A1 | 11/2014 |
| DE | 102014110084 A1 | 1/2016 |
| DE | 102016123877 A1 | 6/2017 |
| DE | 202017103381 U1 | 6/2017 |
| KR | 20150007762 A | 1/2015 |
| WO | 2014207414 A2 | 12/2014 |
| WO | 2017121516 A1 | 7/2017 |

\* cited by examiner

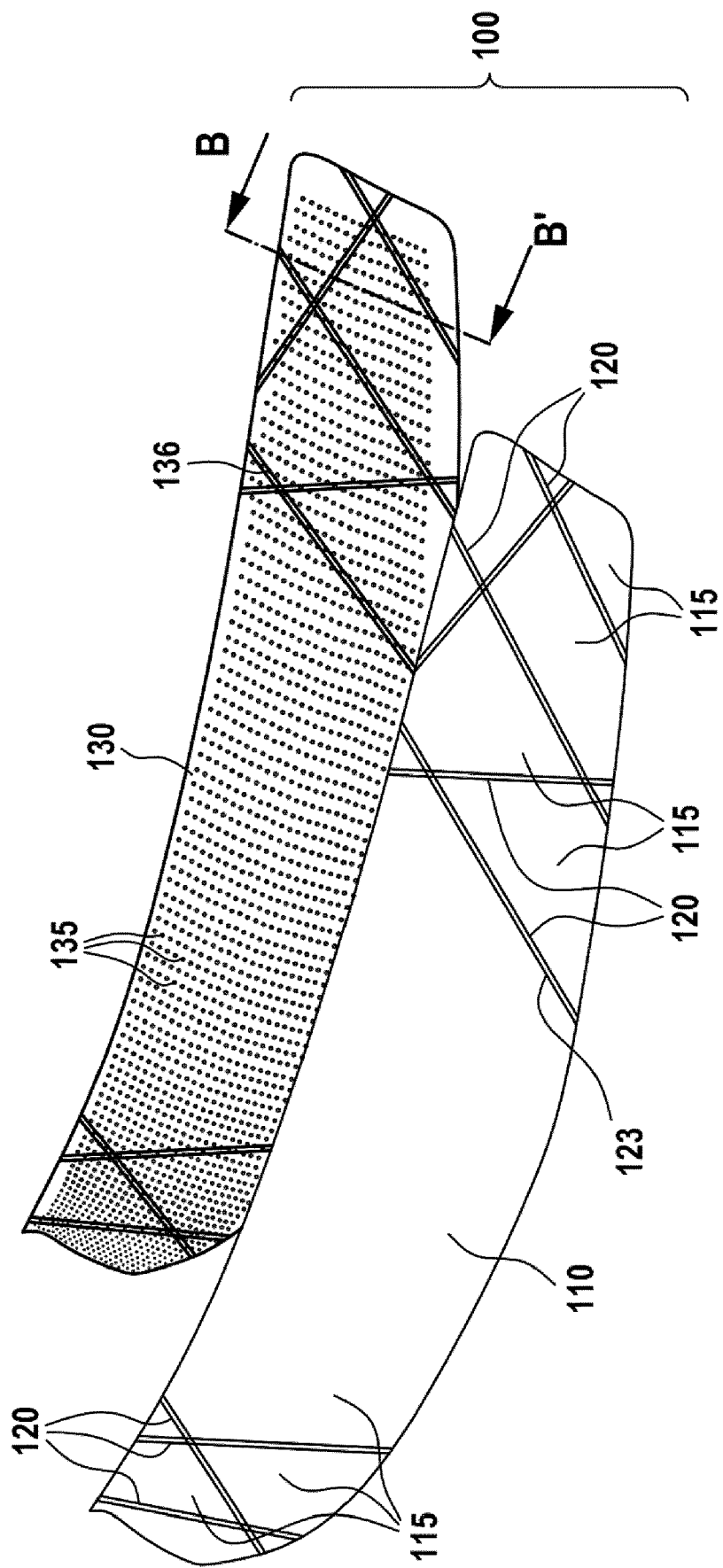

B-B'

B-B'

B-B'

B-B'

LIGHTING DEVICE FOR A VEHICLE, IN PARTICULAR AN ELECTRIC VEHICLE

CROSS-REFERENCE TO RELATED APPLICATIONS

This patent application is a U.S. National Phase Application Under 35 U.S.C. § 371 of International Application No. PCT/EP2018/071834, filed Aug. 10, 2018, entitled "LIGHTING DEVICE FOR A VEHICLE, IN PARTICULAR AN ELECTRIC VEHICLE," which claims the benefit of priority of German Patent Application No. 102017120532.2, filed on Sep. 6, 2017.

FIELD

The present disclosure relates to a lighting device, in particular for integration into a vehicle surface.

BACKGROUND

Motor vehicle lights, such as taillights, in which light-emitting diodes, rather than incandescent lamps, function as illuminants, are known from the prior art. As examples, refer to DE 33 15 785 A1, DE 39 16 875 A1, and DE 42 28 895 A1, which relate to motor vehicle lights or signal lights in which light-emitting diodes are used as illuminants. The known luminous devices are designed according to the requirements of known signal functions of road vehicles.

For example, DE 39 16 875 A1 discloses a signal light that has several functional fields, each functional field being assigned to a specific signal function, such as direction-of-travel indicator, brakes, or tail light. It is desirable in the known lights that the function of the surfaces of the individual functional fields that are visible from the outside are perceptible due to reflected light, and that an adequate warning function is ensured thereby even when the illuminant is switched off, especially at night.

The use is known of accordingly configured headlights and taillights, which are typically present on a vehicle, —for implementing additional signal functions that go beyond the functions required by regulations, for example, the so-called coming-home function or the leaving-home function. For present-day and future vehicles, there currently exists an additional need to implement non-standard signal functions, for example, signaling an autonomous driving mode of the vehicle.

Further exemplary known lighting devices are disclosed in DE 100 21 114 A1, DE 10 2014 110 084 A1, DE 10 2016 123 877 A1, DE 202 16 948 U1, WO 2017/121 516 A1.

SUMMARY

It is an object of the present disclosure to provide a lighting device that can be easily integrated into the design of surface areas of a vehicle, that is simple to manufacture, and that can display various signal functions during use, and that in the switched-off state integrates as inconspicuously as possible into the overall appearance of the vehicle.

This object is achieved by a lighting device having the features of the independent claim 1.

Further features and details of the disclosure can be gathered from the description and the drawings. Particular embodiments of the lighting device are provided in the dependent claims. It should be noted that the features listed individually in the patent claims may be combined with one another in any technologically reasonable manner and disclose further embodiments of the disclosure. The description, in particular in connection with the figures, further characterizes and specifies the disclosure.

A central idea of the present disclosure is to make surface areas of a vehicle accessible to use for signal functions during the course of the integration of light sources, which may be done without loss of space. Accordingly, the device of the disclosure has a very low installation depth and permits the use of materials that are soft in comparison with conventional vehicle body materials, so that, as far as the protection of pedestrians in the event of an impact is concerned, no space for crumple zones or the like is lost apart from the necessary installation depth. In a particular embodiment, the lighting device according to the disclosure is at least partially integrated into a bumper of a vehicle, for example, and is thus a hybrid device consisting of a bumper and a lighting device.

A first aspect of the present disclosure provides a lighting device, particularly for integration into a vehicle surface. The lighting device according to the disclosure includes the following: a cover with optically opaque surface areas, an illuminant carrier arranged behind the cover and having a plurality of light sources, which may be point light sources, and signal structures, arranged between adjacent surface areas, which can be illuminated, in particular, illuminated from the rear, in order to emit light. According to the disclosure, this arrangement can be used to set different signal patterns by means of selective control of certain of the light sources by trans-illuminating or illuminating one or more associated signal structures.

"Optically opaque" in this context means that such a surface area does not emit any light at its surface to the outside when illuminated from the rear side of the cover. This can be achieved in a conventional manner, for example, by a corresponding opaque or light-impermeable surface coating. For example, the cover in the opaque surface areas may be painted with the same paint as the rest of the vehicle body. Alternatively, the optically opaque surface regions may also be coated with surface coating materials that are different from the rest of the vehicle paint job, for example, metallized by vapor deposition, coated with a metal film or alternatively also with a general optically opaque film. The illuminant carrier may be constructed essentially similarly to a circuit board on which a plurality of light sources, which may be point light sources, such as light-emitting diodes, are arranged in a matrix or restricted to specific areas and are wired for electrical control and power supply. A matrix of light sources is particularly suited for maximum flexibility with regard to the design of the signal structures. Alternatively, light sources may be arranged on the illuminant carrier only at such locations as are located directly behind a signal structure arranged in or on the cover.

An inventive signal structure forms part of the cover and may be integrated into the cover. A signal structure may be formed by a light-transmissive structure raised above the adjacent optically opaque surface areas. Alternatively, or additionally, a signal structure may also be a light-transmissive structure terminating flush with the adjacent optically opaque surface areas.

Alternatively, or additionally, a signal structure may also be a light-transmissive structure, forming a depression between the adjacent optically opaque surface areas. In other words, a particular signal structure may be formed in or on the cover by a single one of the measures discussed above or any combination of the measures mentioned above.

In an embodiment, the cover essentially consists of a transparent material, such as a transparent plastic, such as Plexiglas, that is integrated into the desired signal structures.

The optically opaque surface areas defined by the signal structures on the cover may be implemented by the measures already discussed above.

A signal structure in the cover may be implemented as a transparent area, or at least a translucent area when compared with the optically opaque surface areas. Alternatively, or additionally, a signal structure may also be implemented in the cover as a colored and translucent area. For the latter case, it is sufficient if the light sources of the illuminant carrier provided for illuminating the associated signal structure emit white light, since desired color effects are already predetermined by the color of the signal structure. In a particular embodiment, the signal structures are designed to be transparent and the associated light sources can be controlled with respect to the light color or can be light sources with white light.

The lighting device according to the disclosure may be operatively and communicatively connected to a control device for selecting and accordingly controlling the desired signal function. The control device may be programmed to control the light sources required for a particular signal structure so that the thus selected signal structure is illuminated as desired for light output corresponding to the desired signal function.

A signal function can be achieved by uniformly activating associated light sources, i.e., such light sources as are configured for illuminating an associated signal structure. Likewise, individual light sources may be activated at different strengths simultaneously and/or in a predetermined activation order. It is also possible to activate only a certain subset of the light sources associated with the illumination of a specific signal structure.

In addition, a luminous strip or luminous edge may be formed around the individual surface areas or may be completely or partially around the entire cover in the outer portion or edge portion, by accordingly controlling the light sources that are located there.

In a further development, the lighting device may additionally have an additional luminous edge on the periphery (in addition to the illuminant carrier), which may form at least a part or parts in the manner of a frame for the lighting device. The luminous edge may be made, for example, of a diffuse and thus non-transparent material that scatters light. The luminous edge may thus be illuminated by means of a series of light sources arranged behind it. By corresponding activation of the light sources, additional signal effects can thus be generated by the luminous edge.

As said above, the light sources may be point light sources, which may be implemented by means of light-emitting diodes (LEDs), for example by means of organic LEDs (OLEDs). The (O)LEDs may be designed for the generation of RGB colors so that the color of each point light source may be adjusted by a corresponding control. Using light sources that are designed only for white light is also possible, as is a mixed use of RGB light sources and white light sources.

At least some of the light sources, in particular the light sources associated with the specific signal structures, may be additionally provided with a diffuser or light-scattering optical devices and/or with a reflector. By using one or both of these measures, the luminance as well as uniformity of the light distribution in the signal structures can be improved.

In the lighting device according to the disclosure, a light-scattering diffuser layer may additionally be arranged between the cover and the illuminant carrier. In a manner similar to that described above with reference to particular embodiments of the light sources, a diffuser layer may be more favorable, especially in the embodiment of the illuminant support as a light-source matrix, rather than providing a diffuser or a light-scattering optical device on each light source.

In connection with the embodiment of the illuminant carrier as a light source matrix, the cover, and thus the signal structures integrated in the cover, may be designed to be exchangeable. As a result, the lighting device can be adapted relatively quickly to new requirements with minimal effort, or components that are essentially identical with the exception of the cover may be used for different models.

A second aspect of the present disclosure relates to a vehicle, in particular an electric vehicle, having a lighting device according to the first aspect of the disclosure. In the vehicle, at least one control device is provided for controlling the lighting device, especially the light sources arranged therein. The control device is configured to control the light sources in accordance with a desired signal function, so that certain signal structures can be selectively illuminated for light output in order to carry out the desired signal function.

The control device may in particular be configured to control certain signal functions only during operation of the vehicle or only during standstill of the vehicle. Of course, there may also be signal functions that are useful both during operation of the vehicle and during a standstill.

A further aspect of the present disclosure relates to a method for adjusting various signal functions of a lighting device according to the first aspect of the present disclosure, in particular in a vehicle according to the second aspect of the disclosure. The method includes the following steps: selecting a particular signal function; and controlling light sources associated with the selected signal function in order to illuminate from the rear the signal structure or signal structures arranged in front of it in order to emit light.

The lighting device may be activated by means of the method to implement certain signal functions, a signal function being at least one of the group consisting of, but not limited to: coming-home function, leaving-home function, welcome function, daytime running light (DLR light), driving mode indicator of the vehicle, such as autonomous driving, charge state indicator for a drive battery in an electric vehicle, signaling on a surface of a vehicle operations taking place in an area covered by the vehicle, and signaling of available parking space in front of or behind the vehicle, to name but a few examples. A fourth aspect of the present disclosure relates to possible uses of the inventive lighting device of the first aspect of the present disclosure, in particular for implementation on a vehicle, particularly an electric vehicle, wherein the signal functions to be implemented are those described above in connection with the method according to the third aspect of the disclosure.

The disclosure is particularly suited for vehicles, such as motor vehicles, for example electric vehicles, in which a luminous or display surface is to be back-lit or trans-illuminated in various ways. For this purpose, particularly suitable areas are located in the area of the front and rear of a vehicle, and particularly in the area of the headlights and tail lights which are usually provided for road vehicles, for example in the area between these lights.

DESCRIPTION OF THE DRAWING FIGURES

Further advantages, features, and details of the disclosure will become apparent from the following description, in which embodiments of the disclosure are described in detail with reference to the drawings. The features described in the claims and in the description may be relevant to the disclosure individually or in any combination. Likewise, the abovementioned and the further features described herein may be used individually or in any of several combinations thereof. Functionally similar or identical parts or components are in some cases labelled with the same reference symbols. The terms "left," "right," "top," and "bottom" used in the description of the exemplary embodiments refer to the drawings in an orientation with normally readable figure descriptions or normally readable reference symbols. The exemplary embodiments shown and described are not intended to be limiting, but to have an exemplary character for the illustration of the disclosure. The detailed description serves to instruct a person skilled in the art, and known circuits, structures and methods are therefore not shown or explained in detail in the description so as not to obscure the understanding of the present description.

FIGS. 3a-3b are, respectively, a highly simplified exploded view of the layered structure of a lighting device according to the disclosure and a further development of the lighting device.

Figure 3B:
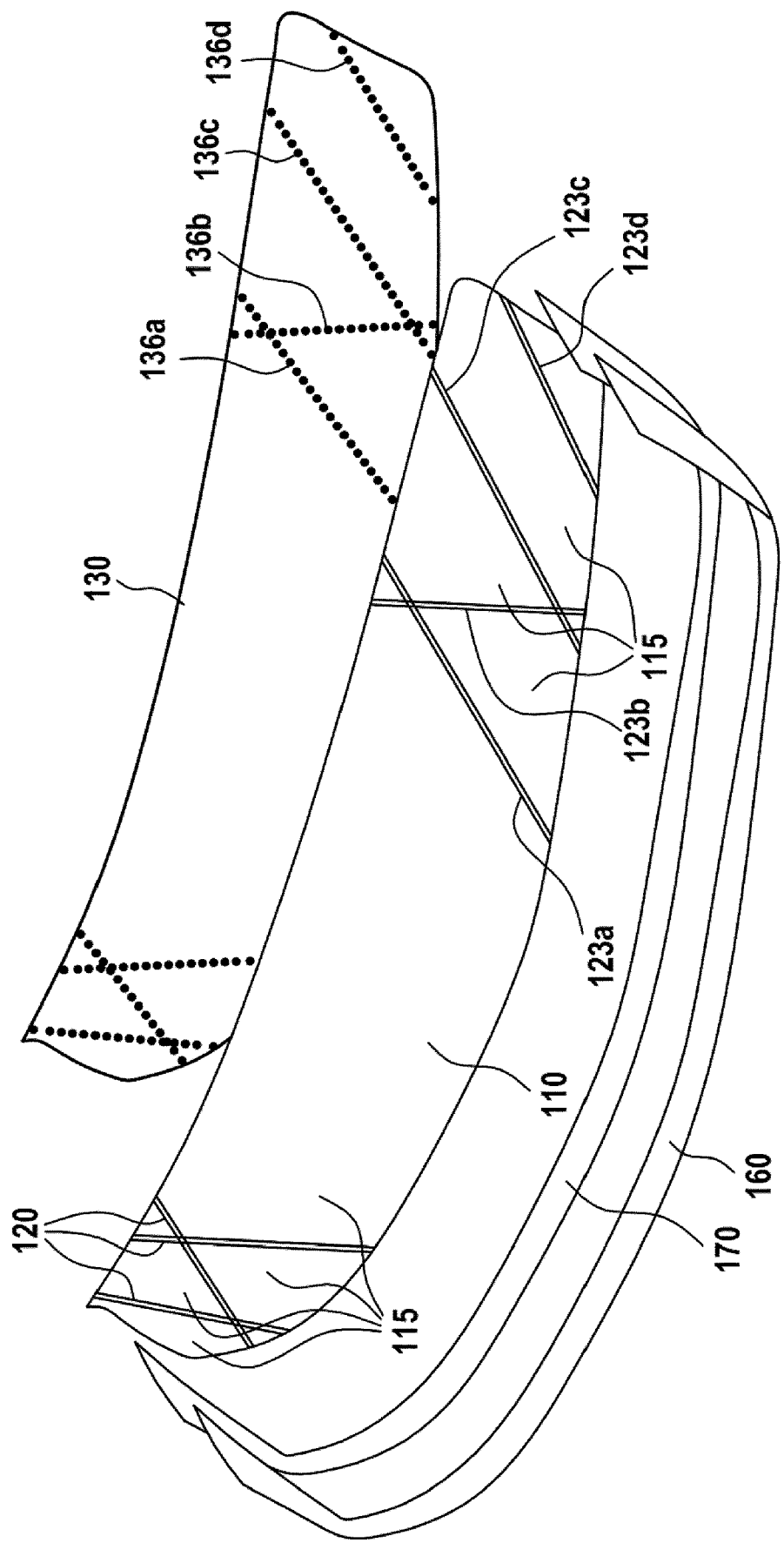
Figure 5A:
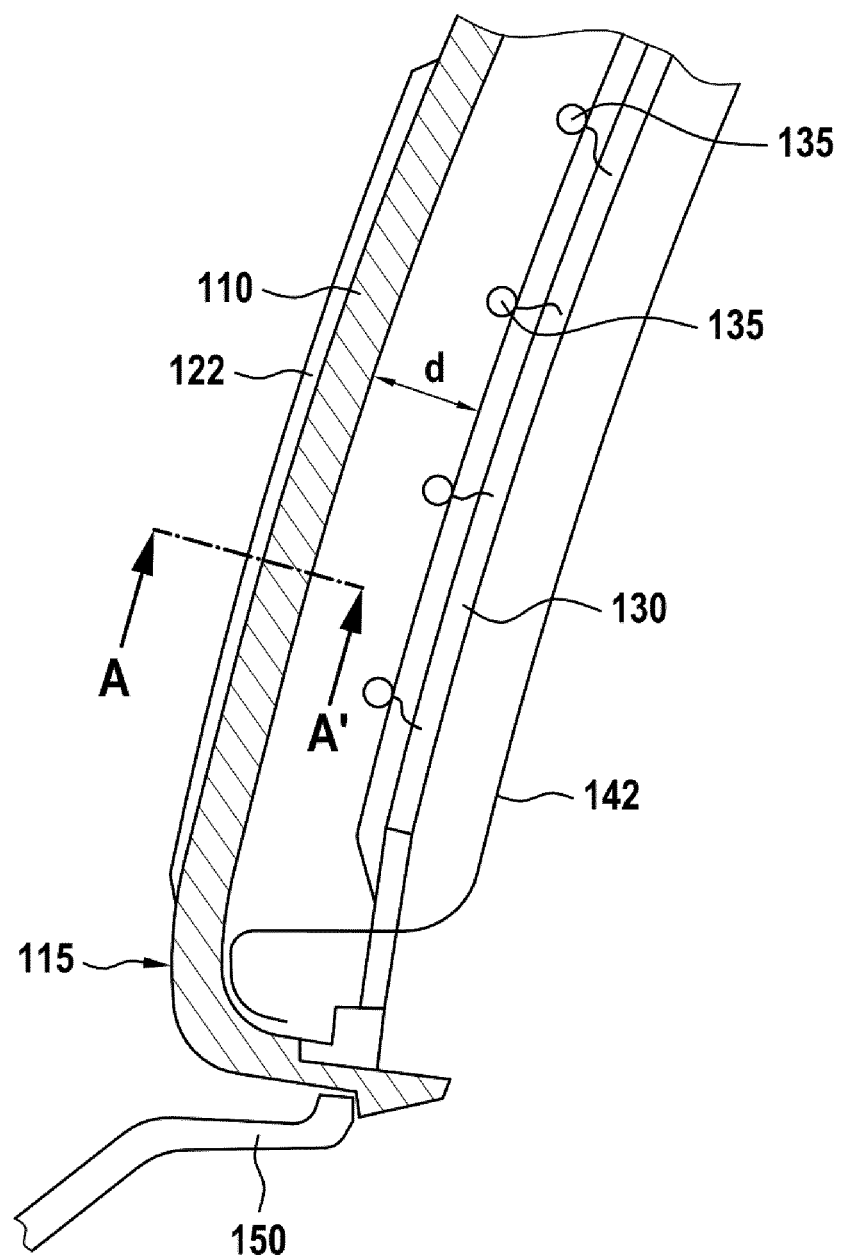
Figure 5B:
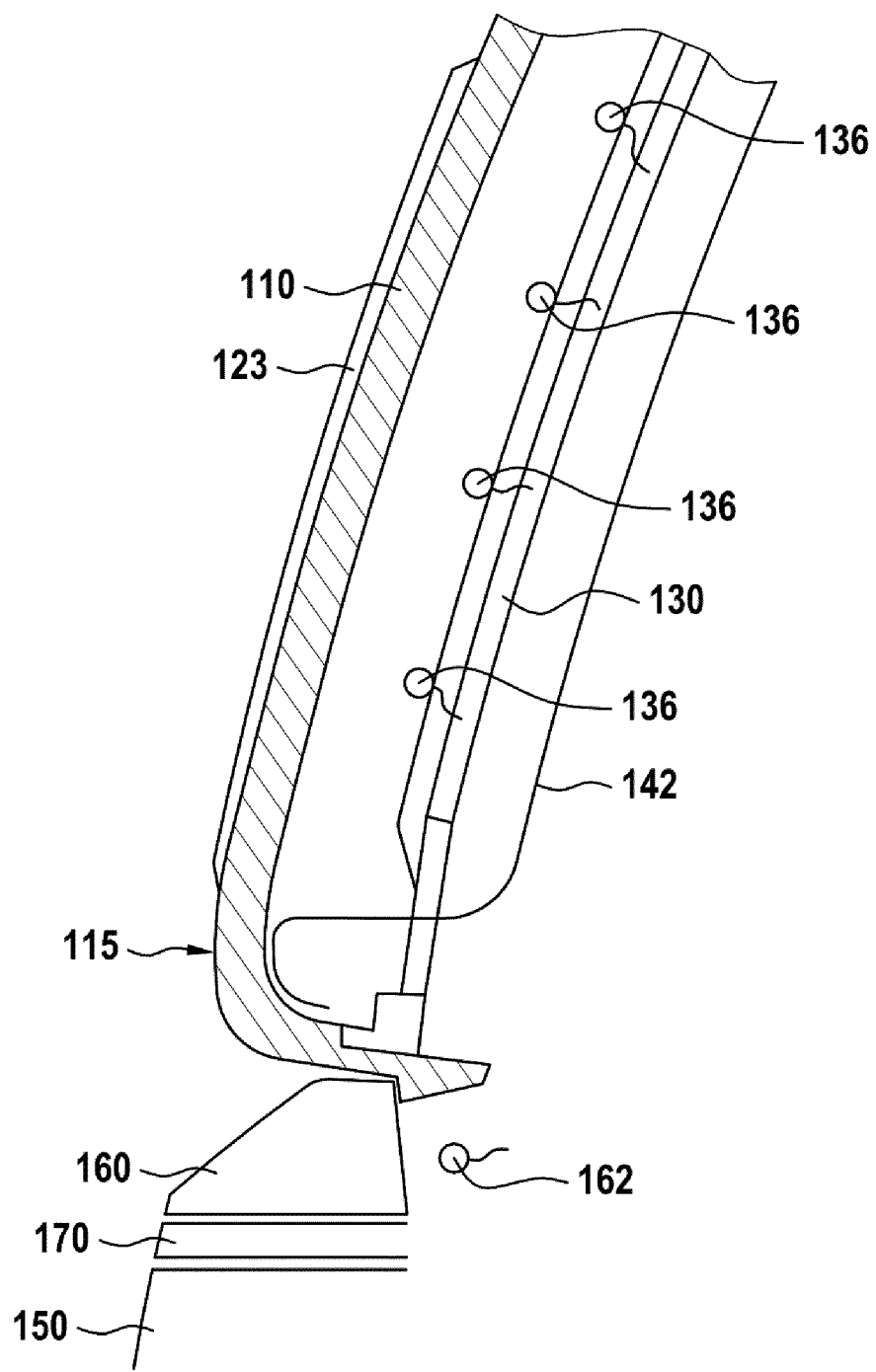

FIGS. 5a-5b each show a partial cross-section of the two exemplary embodiments of the lighting device according to the disclosure as shown in FIGS. 3a and 3b.

Figure 6A:
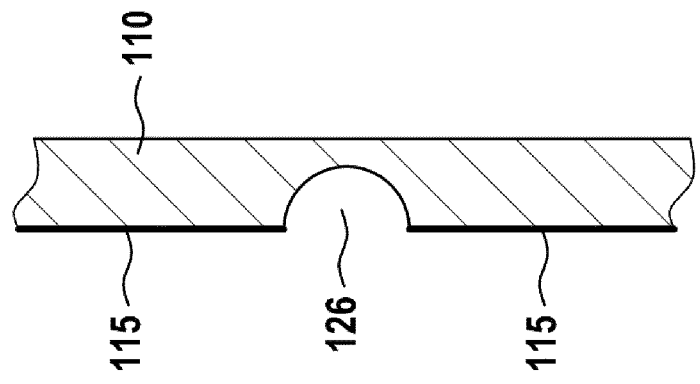
Figure 6B:
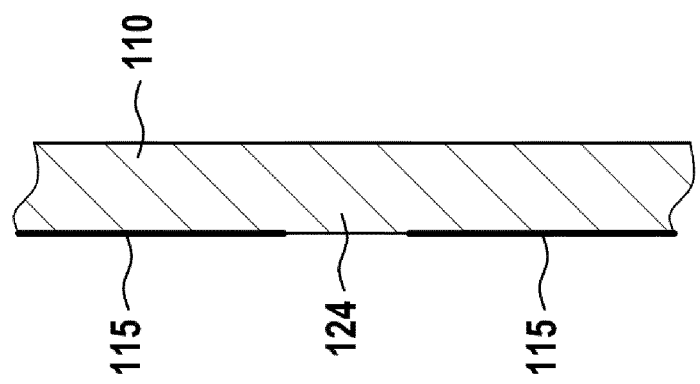
Figure 6C:
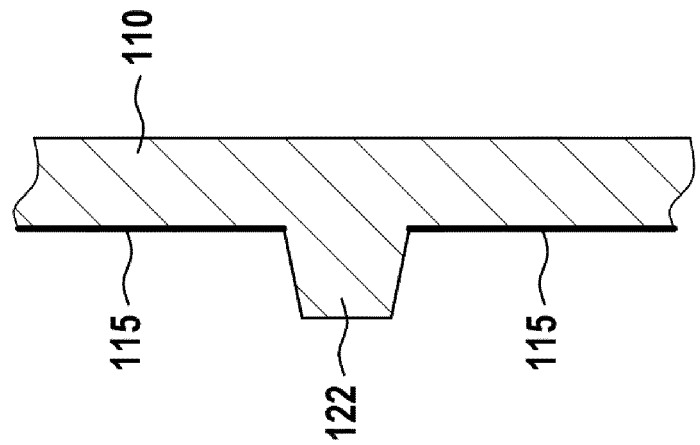

FIGS. 6a-6c illustrate possible implementation options for signal structures according to the disclosure in the cover of a lighting device according to the disclosure.

Figure 7:
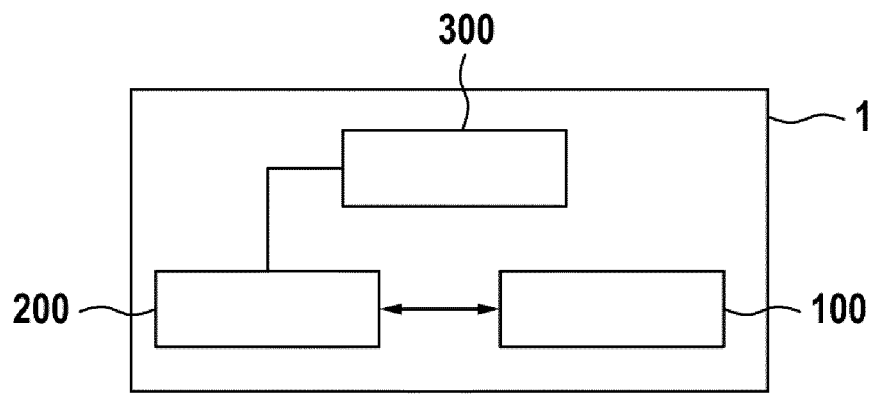

FIG. 7 illustrates in the form of a greatly simplified block diagram a vehicle with a control unit and a lighting device according to the disclosure.

Figure 8:
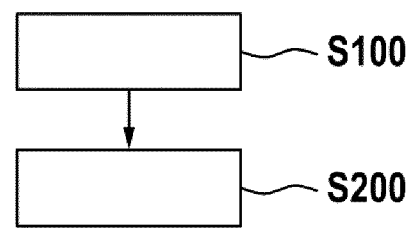

FIG. 8 illustrates a control method according to the disclosure for a lighting device according to the disclosure.

DETAILED DESCRIPTION OF EXEMPLARY EMBODIMENTS

Figure 1:
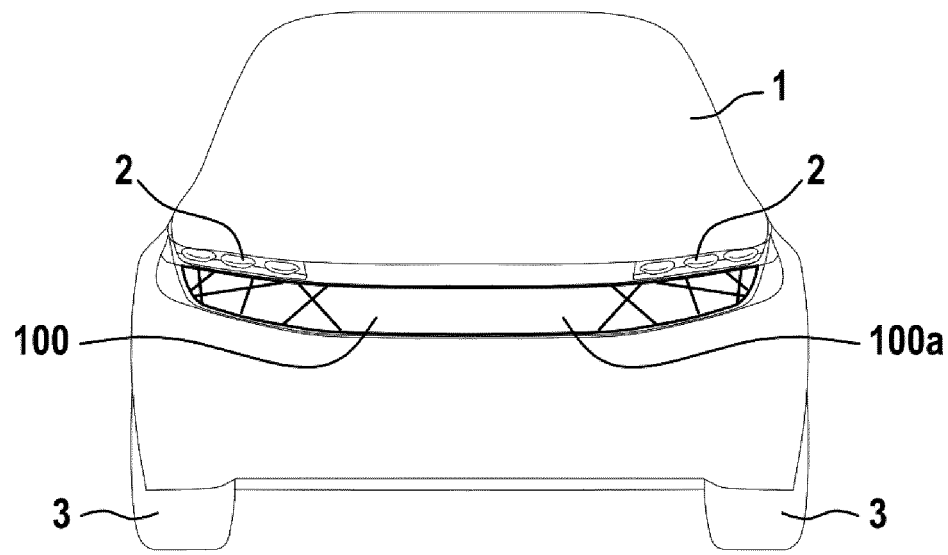
FIGS. 1-2 illustrate suitable application areas for a lighting device according to the disclosure for in each case an electric vehicle front-end (FIG. 1) and an electric vehicle rear-end (FIG. 2).

FIG. 1 shows an exemplary front view of a vehicle 1, wherein only the silhouette and daytime running lights with integrated direction-of-travel indicators 2 as well as wheels 3 of the electric vehicle are shown for orientation. A lighting device 100a according to the disclosure, which forms part of the front bumper, and thus is a hybrid of the lighting device and the bumper, is arranged in the front section of the vehicle between and below the daytime running lights 2.

Figure 2:
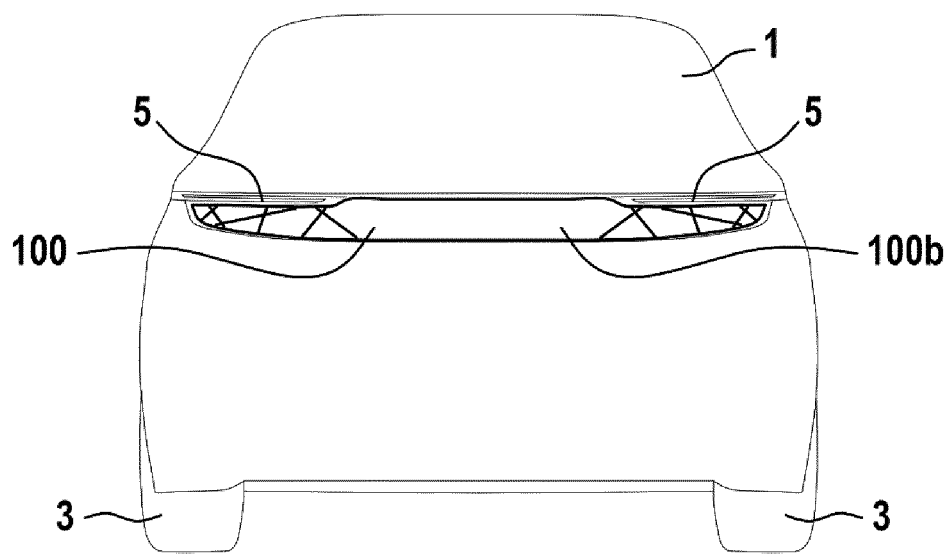

Corresponding to the embodiment in FIG. 1, FIG. 2 shows the rear section of the vehicle 1, wherein a lighting device 100b according to the disclosure is arranged over the entire width of the rear section at the level of the tail lights 5 (brake lights, direction indicator).

FIGS. 3a-3b each show a greatly simplified exploded view of the construction of a first and second exemplary embodiment of a lighting device 100 according to the disclosure. It is essentially the lighting device 100a, which is integrated into the front of the vehicle 1 in FIG. 1.

The lighting devices 100 in FIGS. 3a-3b consist of a cover 110 with opti-cally opaque surface areas 115. Illuminable signal structures 120 (FIGS. 3a, 3b) and 123 (FIG. 3b) are integrated into the surface of the cover 110 between adjacent optically opaque surface areas 115. Embodiment op-tions for the signal structures 120, 123 are explained in more detail with ref-erence to FIGS. 6a-6c.

In the assembled state, which is explained in more detail with reference to FIGS. 5a-5b, an illuminant carrier 130, having a plurality of point light sources 135, 136, is arranged behind the cover 110.

In the exemplary embodiment in FIG. 3a, the illuminant carrier 130 carries a uniform matrix of point light sources 135, which are implemented as organic light-emitting diodes (OLEDs).

In the exemplary embodiment in FIG. 3b, the illuminant carrier 130 also carries groups of point light sources 136a-136d in the form of OLEDs, which are however arranged only at those locations of the illuminant carrier 130 which are located behind associated signal structures 123a-123d of the cover 110. The arrangement of a group of the point light sources 136a-136d on the illuminant carrier 130 thus essentially corresponds to the projection of the associated signal structure 123a-123d onto the surface of the illuminant carrier 130.

In both embodiments in FIGS. 3a-3b, the OLEDs of the point light sources are wired onto the illuminant carrier 130 in a manner known in the art for controlling and supplying power and are connected to a control device (not shown) which is explained in more detail with reference to FIG. 7.

One or more of the illuminable signal structures 120, 123 of FIG. 3a, which are integrated into the cover 110, can be illuminated selec-tively by controlling point light sources (e.g., 136) of the matrix of point light sources associated with the corresponding signal structure (e.g., 123).

The illuminable signal structures 123a-123d in FIG. 3b, which are integrated into the cover 110, may also be selectively illuminated by controlling the respective groups of point light sources (e.g., 136a) required for the purpose of transillumination or illumination of the one or more associated signal structures (e.g., 123a).

Different signal patterns may thus be displayed with the lighting device 100 in FIG. 3a or FIG. 3b.

Compared with FIG. 3a, the lighting device 100 in FIG. 3b further differs in that it has a luminous edge 160, partially surrounding the peripheral edge of the luminous device 100 (U-shaped in the exemplary embodiment). The luminous edge 160 is essentially formed from a translucent but diffuse, for example, white-tinted plastic, such as Plexiglas. A group of point light sources (not shown in FIG. 3b), which is arranged behind the luminous edge 160, is likewise provided for illuminating the luminous edge 160.

Here as well, the point light sources may be implemented as LEDs. Organic LEDs (OLEDs) are also possible.

FIGS. 4a to 4d illustrate a portion of the section, indicated as BB' in FIG. 3a, through the matrix with point light sources 135. However, the following embodiments are similarly applicable to the exemplary embodiment in FIG. 3b.

Figure 4A:
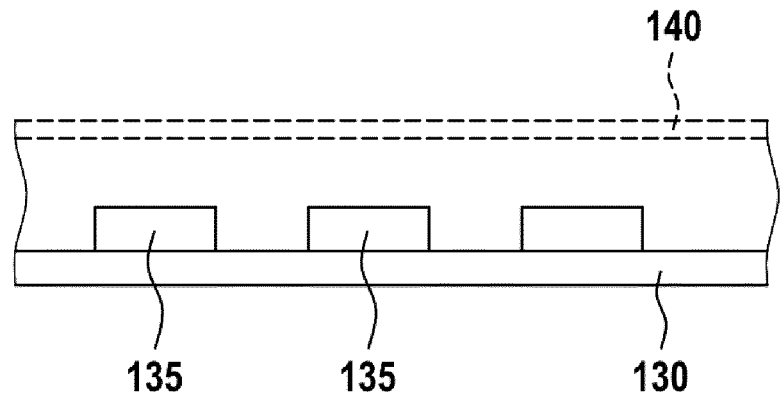
FIGS. 4a-4d illustrate possible designs of the point light sources for a lighting device according to the disclosure.

FIG. 4a shows a first embodiment in which individual (O)LEDs are arranged on the illuminant carrier 130 as point light sources 135. For better scattering of the light emitted by a triggered (O)LED, a diffusor layer 140 may be arranged between the illuminant carrier 130 and the cover 110.

A diffusor layer 140 may be a thin layer, consisting of a color-neutral, for example white, semi-translucent material that scatters the light transmitted through the layer. The material of the diffusor layer 140 may also contain particles of a suitable size where light that is transmitted through the layer diffuses.

Figure 4B:
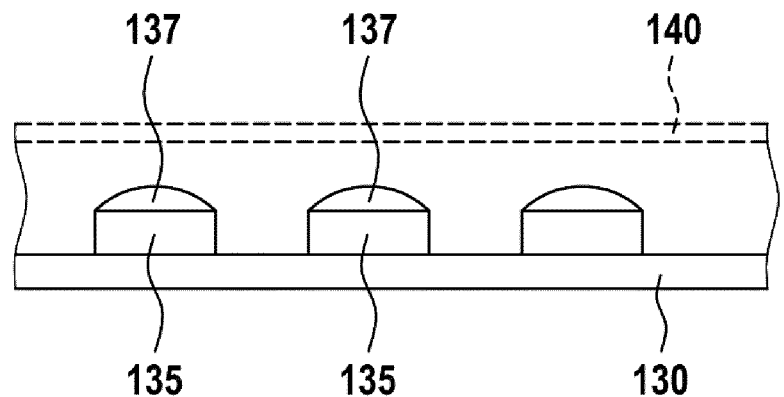

Compared with FIG. 4a, FIG. 4b shows an alternative second embodiment in which the individual light sources 135, which are designed as (O)LEDs, are additionally provided with a light-scattering optical device 137. In principle, the diffuser layer 140 of FIG. 4a can then be omitted, but it may also be provided in addition.

Figure 4C:
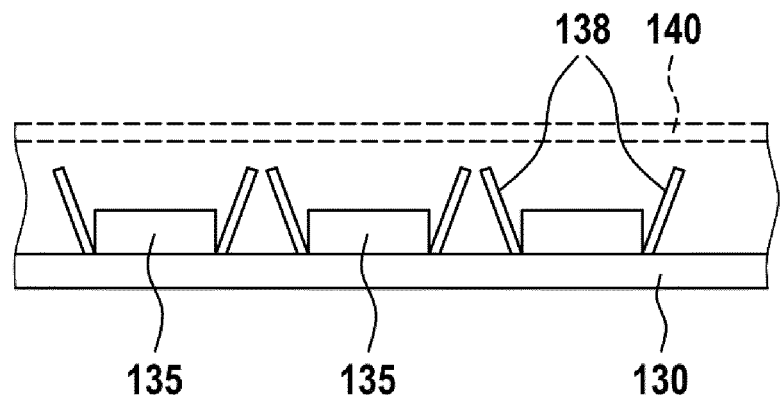

FIG. 4c shows a further development of the illuminant carrier 130 in FIG. 4a, wherein the individual point light sources 135, which are designed as (O)LEDs, are each additionally provided with a reflector 138 for optimizing the light emission and for scattering the light. In this embodiment too, it may be possible to provide the diffuser layer 140 shown in FIG. 4a between the illuminant carrier 130 and the cover 110.

Figure 4D:
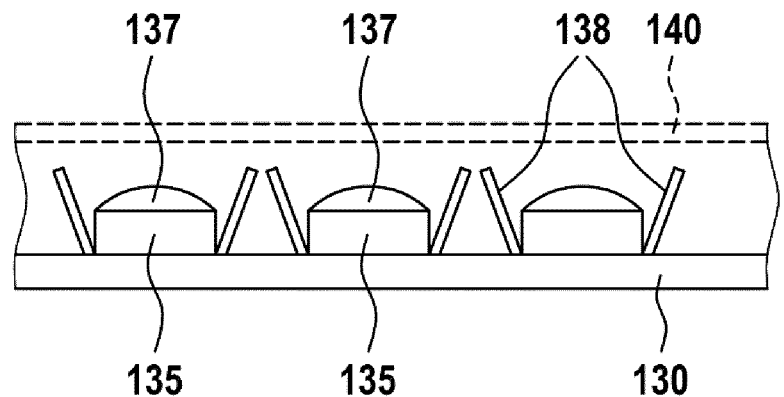

FIG. 4d illustrates essentially a combination of the embodiments according to FIGS. 4b and 4c, i.e., each point light source 135, which is designed as a(n) (O)LED, on the illuminant carrier 130 is provided with a reflector 138 as well as provided with a light-scattering optical device 137 for light scattering. In principle, the diffusor layer 140 of FIG. 4a can then be omitted as well, but it may also be provided in addition.

FIGS. 5a-5b each illustrate the exemplary embodiments in FIGS. 3a-3b of the lighting device 100 according to the disclosure in each case in a greatly simplified and enlarged cross-sectional representation.

The illuminant carrier 130 in FIG. 5a carries the above-described point light source matrix with point light sources 135, implemented as OLEDs. The illuminant carrier 130 in FIG. 5b accordingly only carries the above-described groups of (O)LEDs as point light sources 136a-136d.

The cover 110, which is essentially made of a transparent plastic, such as Plexiglas, is arranged at a distance d, where d is approximately in the order of magnitude of millimeters to a maximum of 1 to 2 centimeters.

Raised signal structures 122 (FIG. 5a) and 123 (FIG. 5b), each of which is illustrated as a bar in the cross-sectional view in FIGS. 5a-5b, are integrated into the cover 110 of FIGS. 5a and 5b. The surface areas of the cover 110 not occupied by the raised signal structures 122 or 123 form the optically opaque surface areas 115. As explained elsewhere, the optically opaque area may be designed, for example, by an appropriate painting of the cover, by coating with a film, or by vapor deposition with a metal.

Of course, other embodiments (see non-limiting FIGS. 6a-6c) are possible, but it must be ensured that the part of the cover 110 that carries a signal structure 120 is transparent, or at least sufficiently light-transmissive to allow illumination of the signal structure 120 from the inside of the cover 110.

Furthermore, regardless of the implementation details pertaining to the lighting device 100, FIGS. 5a and 5b further illustrate how the lighting device 100 may be integrated into a surface area of a vehicle.

In the example shown in FIG. 5a, the illuminant carrier 130 is fastened to the cover 110 by means of a rear wall 142 on the side facing the vehicle in the mounting position, the cover 110 in turn being affixed by means of releasable connections, here in the form of a known snap-lock fastener, which is attached to an adjacent part 150 of the vehicle at suitably formed locations. In the example, a hook of the snap-lock fastener undercuts a recess on the adjacent vehicle part 150, thus fastening the lighting device 100.

In the example shown in FIG. 5b, the illuminant carrier 130 is also fastened to the cover 110 by means of the rear wall 142 on the side facing the vehicle in the mounting position. In contrast to FIG. 5a, however, the cover 110 is here fastened by means of releasable connections (e.g., snap-lock fasteners) at suitably formed locations on the luminous edge 160, which is described with reference to FIG. 3b.

The luminous edge 160 is in turn surrounded by a frame element 170, such as an aluminum frame. The frame element 170 is thus arranged between the adjacent part 150 of the vehicle and the luminous edge 160.

Behind the luminous edge 160, LEDs or OLEDs, are arranged as point light sources, which can also be controlled in a manner known in the art and can be activated to illuminate the luminous edge 160.

In the example in FIG. 5b, a hook of the snap-lock fastener undercuts the luminous edge 160, thus fastening the lighting device 100 and so on at the luminous edge 160.

FIGS. 6a-6c are non-limiting illustrations of implementation options for the signal structures 120 in the cover 110.

In FIG. 6a, which essentially corresponds to the cross-section AA' shown in FIG. 5, the signal structure 122 consists of a structure, such as a bar, which protrudes from, i.e., is raised above, the covering surface. The cross-section of this bar is illustrated as, but is not limited to, a trapezoidal shape in FIG. 6a. The cross-section of the structure 122 can in principle have any desired cross-sectional shape, such as semicircular, triangular, rectangular, or have any polygonal structure. The bar as a signal structure 122 protrudes from the plane formed by the cover 110 and extends between two neighboring and adjacent optically opaque surface regions 115. The optically opaque surface areas 115 are implemented, for example, by a film or paint layer that is optically opaque.

In FIG. 6b, the signal structure 124 is designed to be co-planar with the neighboring, adjacent light-impermeable surface areas 115. Here too, the optically opaque surface areas 115 are implemented by a coating, such as a paint layer or a film.

In FIG. 6c, the signal structure 126 is implemented between neighboring, adjacent optically opaque surface areas 115 in the form of a recess or groove to form the light-emitting signal structure 126.

In addition to the embodiment options illustrated in FIGS. 6a-6c, it should be noted here that the respective signal structure 122, 124, 126 may be created, for example, by means of a 2K injection-molding process by two components (2K), together with the optically opaque surface areas 115.

The optically opaque areas 115 can thereby be implemented with a optically opaque material over the entire material thickness of the cover 110, and the respective signal structures 122, 124, 126 can be implemented with a transparent, or at least translucent, material.

FIG. 7 illustrates, greatly simplified, a system consisting of the vehicle 1, such as an electric vehicle, as shown as a silhouette in FIGS. 1 and 2, for example, wherein at least one lighting device 100 according to the disclosure is present in the vehicle 1. A control device 200, which is operatively and communicatively connected to the lighting device 100 for controlling and supplying power, is provided for controlling, in particular for implementing the signal functions by means of the lighting device 100.

It should be noted that the lighting device can of course also be supplied with the required power independently of the control device 200 and only receive control commands for controlling the individual point light sources 135 from the control device 200.

The control device 200 is programmed by means of a corresponding control program to control a desired signal function by controlling an associated signal structure 120, 122, 123, 124, 126, which is integrated into the cover 110, to perform the desired signal function by correspondingly controlling the associated point light sources 135, 136. For this purpose, as discussed in the context of FIG. 3, the control device 200 may only control the point light sources 136 of the point light source matrix, which are associated with the structure 123 on the cover 110.

At this point, it should be expressly noted independently of the description of FIGS. 7 and 3a, that it is, of course, possible to arrange or provide only point light sources (e.g., 136) on the illuminant carrier 130 that are required for the corresponding signal structures (e.g. 123) in the cover 110, as illustrated in FIG. 3b.

The embodiment as a matrix with a plurality of point light sources provides for that, for example, the failure of individual point light sources can be compensated for by adjacent point light sources; furthermore, a high degree of flexibility can be achieved because only one illuminant carrier 130 needs to be produced for a plurality of lighting devices. Furthermore, if desired, the design of the signal structures 120 on the cover 110 may be changed by a simply replacing the cover 120 by a new cover with different structures. In this case, only the control program for carrying out the signal function with the respective signal structures 120 would have to be adapted on the software level in order to control the point light sources 135 corresponding to the individual signal structures 120 on the cover 110.

FIG. 8 finally illustrates a method for carrying out various signal functions by means of a lighting device, as explained in the context of FIGS. 1 to 6, in particular in a vehicle, such as an electric vehicle, in the context of FIG. 7.

For this purpose, a signal function to be implemented is determined and thus selected in a step S100, for example, by an evaluation of vehicle state information available in the control device 200.

Subsequently, the selected signal function is carried out in a step S200 by controlling associated point light sources 135 of the illuminant carrier 130 in order to illuminate the associated signal structure 120 or signal structures 120 arranged in front with light so that they can in turn emit the light to the outside.

Using the method, numerous signal functions can be implemented, as already explained elsewhere. In what follows, some signaling functions are listed as non-limiting list.

For example, a coming-home function, a leaving-home function, a welcome function, a daytime running light function, a driving mode indicator of the vehicle, for example, to indicate to other road users that the vehicle is currently in "autonomous driving" mode, a charge state indicator for the charge state of a drive battery in the case of an electric vehicle, or signaling processes on a surface of a vehicle, for example at the rear of the vehicle 1 of FIG. 2, the processes being those taking place in a region obscured by the vehicle 1, i.e., in front of the vehicle. A further signal function may be signaling available parking space in front of, or behind, the vehicle by means of corresponding signals when the vehicle itself is being parked.

The above detailed description only illustrates certain exemplary embodiments of the present disclosure and is not intended to limit the scope of the present disclosure. Those of ordinary skill in the art understand the description as a whole so that technical features described in connection with the various embodiments can be combined into other embodiments understandable to those of ordinary skill in the art. Also, any equivalent or modification of the described embodiments as well as combinations thereof do not depart from the spirit and principle of the present disclosure and falls within the scope of the present disclosure as well as of the appended claims. As such, provided that these modifications and variants fall into the scope of the claims and equivalent technologies thereof, it is intended to embrace them within the present disclosure as well.

What is claimed is:

1. A lighting device for integration into a vehicle surface, comprising:
   an exterior cover having optically opaque surface areas,
   illuminable light-transmissive signal structures formed in the exterior cover between the opaque surface areas for light emission, and
   a light source carrier arranged behind the exterior cover and having a plurality of light sources arranged in a uniform matrix over a surface of the light-source carrier, wherein each signal structure is illuminated by a group of light sources selected from the plurality of light sources in the uniform matrix,
   wherein different signal patterns can be adjusted by means of selective activation of certain of the light sources for trans-illumination or illumination of one or more associated signal structures.

2. The lighting device according to claim 1, wherein a signal structure is at least one of the group, consisting of:
   structures raised with respect to adjacent optically opaque surface areas,
   structures terminating co-planar with the adjacent optically opaque surface areas,
   an optically opaque structure forming a depression between the adjacent optically opaque surface areas, or
   a combination thereof.

3. The lighting device according to claim 1, wherein
   a signal structure has a transparent, at least translucent, design and the light color of the associated light sources is adjustable, or
   a signal structure is designed to be colored and translucent, and the associated light sources emit white light.

4. The lighting device according to claim 1, wherein the light sources are point light sources, in particular light emitting diodes, LEDs; and
   wherein the LEDs are preferably organic LEDs, OLEDs; and
   wherein the LEDs are more preferably designed for the generation of RGB colors, so that the color of a point light source may be adjusted by a corresponding control.

5. The lighting device according to claim 1, wherein at least one of the light sources, in particular the light sources associated with certain signal structures
   are equipped with a diffusor or a light-scattering optical device, and/or
   are equipped with a reflector.

6. The lighting device according to claim 1, wherein a light-scattering diffusor layer is arranged between the cover and the illuminant carrier.

7. The lighting device according to claim 1, wherein the external cover is designed to be exchangeable.

8. The lighting device according to claim 1, wherein
   the light sources are arranged distributed in a matrix on the illuminant carrier substantially over the entire surface of the cover.

9. The lighting device according to claim 1, wherein the lighting device additionally has a light edge on its periphery, which preferably forms at least a part or parts of a peripheral line or a frame of the lighting device.

10. A vehicle, in particular an electric vehicle, having a lighting device for integration into the vehicle surface and a control device, wherein the lighting device comprises:

an exterior cover having optically opaque surface areas, illuminable light-transmissive signal structures formed in the exterior cover between the opaque surface areas for light emission, and a light source carrier arranged behind the exterior cover and having a plurality of light sources arranged in a uniform matrix over a surface of the light-source carrier, wherein each signal structure is illuminated by a group of light sources selected from the plurality of light sources in the uniform matrix, wherein different signal patterns can be adjusted by means of selective activation of certain of the point light sources for trans-illumination or illumination of one or more associated signal structures, wherein the control device controls the point light sources, wherein the point light sources are programmably controllable by the control device so that certain signal structures can be selectively illuminated in whole or in part for light emission in order to perform a specific signal function.

11. The vehicle according to claim 10, wherein the controller is configured to control certain signal functions during operation of the vehicle and other signal functions during standstill of the vehicle.

12. A method for performing various signal functions of a lighting device for integration into a vehicle surface, wherein the vehicle includes the lighting device and a control device, wherein the lighting device comprises:

an exterior cover having optically opaque surface areas, illuminable light-transmissive signal structures formed in the exterior cover between the opaque surface areas for light emission, and a light source carrier arranged behind the exterior cover and having a plurality of light sources arranged in a uniform matrix over a surface of the light-source carrier, wherein each signal structure is illuminated by a group of light sources selected from the plurality of light sources in the uniform matrix, wherein different signal patterns can be adjusted by means of selective activation of certain of the point light sources for trans-illumination or illumination of one or more associated signal structures, wherein the control device controls the point light sources, wherein the point light sources are programmably controllable by the control device so that certain signal structures can be selectively illuminated in whole or in part for light emission in order to perform specific signal functions, wherein the method comprises:

selecting a specific signal function; and performing the selected signal function by controlling associated point light sources to illuminate the signal structure or signal structures, disposed in front of it, from the back to emit light.

13. The method according to claim 10, the signal functions being at least one of the group, consisting of:

coming-home function, leaving-home function, welcome function, daytime running lights, driving mode indicator of the vehicle, such as autonomous driving, charge state indicator for a drive battery in an electric vehicle, signaling on a surface of the vehicle of operations taking place in an area obscured by the vehicle, and signaling of available parking space in front of, or behind, the vehicle, in particular when the vehicle itself is being parked.

* * * * *